United States Patent
Jiang

(10) Patent No.: US 10,108,228 B2
(45) Date of Patent: Oct. 23, 2018

(54) VIRTUAL REALITY GOGGLE

(71) Applicant: Beijing Xiaomi Mobile Software Co., Ltd., Haidian District, Beijing (CN)

(72) Inventor: Hao Jiang, Beijing (CN)

(73) Assignee: BEIJING XIAOMI MOBILE SOFTWARE CO., LTD., Haidian District, Beijing (CN)

( * ) Notice: Subject to any disclaimer, the term of this patent is extended or adjusted under 35 U.S.C. 154(b) by 0 days.

(21) Appl. No.: 15/469,597

(22) Filed: Mar. 27, 2017

(65) Prior Publication Data
US 2018/0032101 A1    Feb. 1, 2018

(30) Foreign Application Priority Data

Jul. 27, 2016    (CN) .......................... 2016 1 0605378

(51) Int. Cl.
*G09G 5/00*    (2006.01)
*G06F 1/16*    (2006.01)
(Continued)

(52) U.S. Cl.
CPC ........... *G06F 1/163* (2013.01); *G02B 27/017* (2013.01); *G02B 27/0176* (2013.01); *G02B 27/028* (2013.01); *G02B 27/22* (2013.01); *G06F 1/1601* (2013.01); *G02B 2027/0134* (2013.01); *G02B 2027/0154* (2013.01)

(58) Field of Classification Search
CPC ...... G06F 1/1601; G06F 1/163; G06F 3/0346; G02B 27/01; G02B 27/017; G02B 27/0172; G02B 27/0176; G02B 27/22; G02C 3/003; G02C 11/10
See application file for complete search history.

(56) References Cited

U.S. PATENT DOCUMENTS 9,839,166 B2 *   12/2017   Kim ................... H05K 7/20972
2010/0079356 A1 *   4/2010   Hoellwarth .......... G02B 27/017
                                                                345/8

(Continued)

FOREIGN PATENT DOCUMENTS

CN    204462542 U    7/2015
CN    204967946 U    1/2016

(Continued)

OTHER PUBLICATIONS

First Office Action of Chinese Application No. 201610605378.3, dated Aug. 9, 2017.

(Continued)

*Primary Examiner* — Joe H Cheng
(74) *Attorney, Agent, or Firm* — Jun He Law Offices P.C.; James J. Zhu

(57) ABSTRACT

A virtual reality (VR) goggle is provided. The VR goggle is operable with an electronic device for displaying VR content and includes: a body including a second clamping part on a distal facet of the body; a cover positioned at a distal side of the body to form a cavity between the cover and the distal facet of the body to accommodate the electronic device for displaying VR content, the cover including a first clamping part on an internal surface of the cover; and wherein the first clamping part is operable with the second clamping part to securely confine the electronic device within the cavity.

16 Claims, 5 Drawing Sheets

(51) Int. Cl.
  *G02B 27/02* (2006.01)
  *G02B 27/22* (2018.01)
  *G02B 27/01* (2006.01)

(56) References Cited

U.S. PATENT DOCUMENTS

| | | | |
|---|---|---|---|
| 2015/0103152 A1* | 4/2015 | Qin | H04N 13/044 348/53 |
| 2015/0138645 A1* | 5/2015 | Yoo | G02B 27/0101 359/630 |
| 2015/0234189 A1 | 8/2015 | Lyons | |
| 2015/0348327 A1* | 12/2015 | Zalewski | G06F 3/01 345/419 |
| 2016/0011425 A1* | 1/2016 | Thurber | G02B 27/64 345/8 |
| 2016/0025990 A1 | 1/2016 | Zhang | |
| 2016/0062125 A1* | 3/2016 | Baek | G02B 27/0176 361/679.01 |
| 2016/0062454 A1* | 3/2016 | Wang | G09G 5/003 345/633 |
| 2016/0062514 A1* | 3/2016 | Jo | G02B 27/017 345/174 |
| 2016/0063767 A1* | 3/2016 | Lee | G06T 19/006 345/419 |
| 2016/0224176 A1* | 8/2016 | Kim | G06F 3/0416 |
| 2017/0094816 A1* | 3/2017 | Yun | G02B 27/022 |
| 2017/0153672 A1* | 6/2017 | Shin | G06F 1/163 |
| 2017/0212574 A1* | 7/2017 | Kang | G06F 1/266 |
| 2017/0318281 A1* | 11/2017 | Edlund | H04N 13/044 |

FOREIGN PATENT DOCUMENTS

| | | |
|---|---|---|
| CN | 105467591 A | 4/2016 |
| CN | 105589562 A | 5/2016 |
| CN | 205281022 U | 6/2016 |
| CN | 205281023 U | 6/2016 |
| CN | 106019597 A | 10/2016 |
| CN | 205899147 U | 1/2017 |
| JP | S63138587 U | 9/1988 |
| JP | 2016080745 A | 5/2016 |
| WO | 2015145863 A1 | 10/2015 |
| WO | 2016085394 A1 | 6/2016 |
| WO | 2017023401 A1 | 2/2017 |

OTHER PUBLICATIONS

Anonymous: "Vesalia Online—Enclosure for Banana Pi", Feb. 1, 2016(Feb. 1, 2016), XP055411307, Retrieved from the Internet: URL: https://web.archive.org/web/20160201210139/http://www.vesalia.de/e_bananapiencwhite.htm.
Extended European search report for European application No. 17157332.2, dated Oct. 19, 2017.
International Search Report of PCT Application No. PCT/CN2016/106378.

* cited by examiner

VIRTUAL REALITY GOGGLE

CROSS-REFERENCE TO RELATED APPLICATION

This application is based on and claims priority to Chinese Patent Application No. 201610605378.3, filed on Jul. 27, 2016, which is incorporated herein by reference in its entirety.

FIELD

The present disclosure relates to the technical field of virtual reality (VR), and in particular to a VR goggle.

BACKGROUND

Virtual reality (VR) technology is a computer simulation system, which may generate an emulated environment and provide a user with immersed application experience by ways, such as, a three-dimensional dynamic visual and an interaction of entity behaviors etc.

Typically, a simple and cheap VR solution is proposed by providing VR goggle including a VR functional component and using an electronic device (such as, a mobile phone, a tablet etc.) of a user to play VR content.

However, since there are great differences in size, specification and materials etc. between different electronic devices, the VR goggle usually cannot secure the electronic device efficiently. As a result, the electronic device is easy to suffer from shaking and waggling, and therefore immersion of the user during use of the VR goggle may be affected and the user may even have discomfort, such as, dizziness.

SUMMARY

According to a first aspect of embodiments of the disclosure, virtual reality (VR) goggle are provided. The VR goggle is operable with an electronic device for displaying VR content and includes: a body including a second clamping part on a distal facet of the body; a cover positioned at a distal side of the body to form a cavity between the cover and the distal facet of the body to accommodate the electronic device for displaying VR content, the cover including a first clamping part on an internal surface of the cover; and wherein the first clamping part is operable with the second clamping part to securely confine the electronic device within the cavity.

It is to be understood that both the forgoing general description and the following detailed description are exemplary and interpretative only, and are not restrictive of the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which same reference numbers in different drawings represent same or similar elements unless otherwise described. The implementations set forth in the following description of exemplary embodiments do not represent all implementations consistent with the disclosure. Instead, they are merely examples of devices and methods consistent with aspects related to the disclosure as recited in the appended claims.

Figure 1:
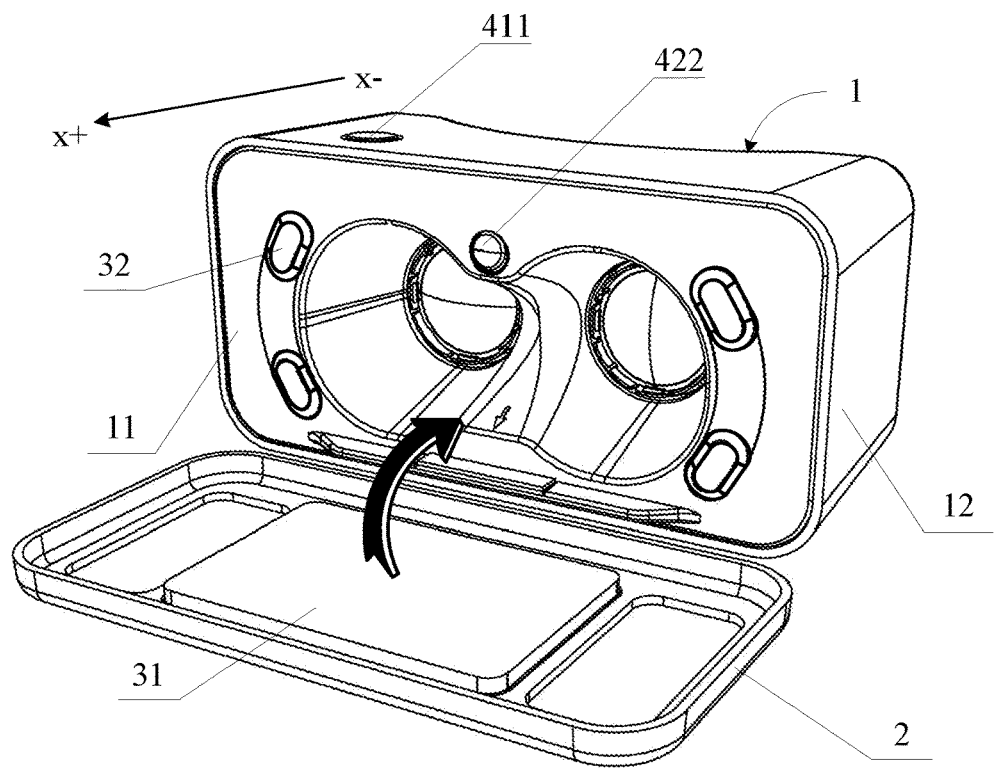
FIG. 1 is a schematic three-dimensional structural diagram showing a virtual reality (VR) goggle according to an exemplary embodiment of the disclosure.
Figure 2A:
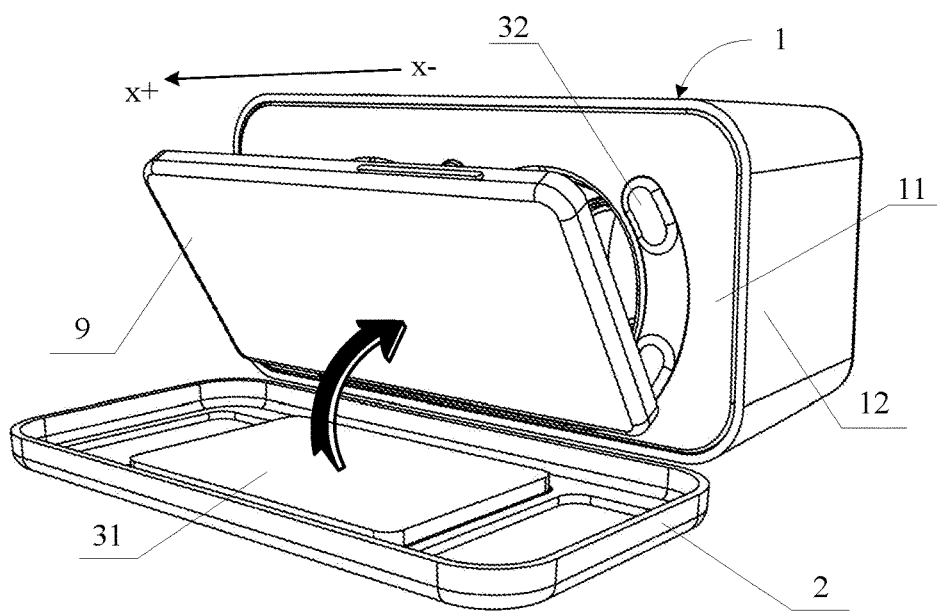
FIG. 2A is a schematic diagram showing an engagement of a VR goggle with an electronic device according to an exemplary embodiment of the disclosure.

FIG. 1 is a schematic three-dimensional structural diagram showing a virtual reality (VR) goggle according to an exemplary embodiment of the disclosure. FIG. 2A is a schematic diagram showing an engagement of the VR goggle with an electronic device according to an exemplary embodiment of the disclosure. As shown in FIGS. 1-2A, the VR goggle may include a body 1 and a cover 2.

The body 1 includes a VR functional component 11 therein.

The cover 2 is positioned at a distal side of the body 1. A cavity is formed between the cover 2 and a distal facet of the body 1 to accommodate an electronic device 9 for displaying VR content. The meaning of the above "distal side/facet" may be understood according to a relative distance relationship between each component of the VR goggle and a user wearing the VR goggle, since the user should wear the VR goggle on his/her face. For example, regarding the VR goggle shown in FIGS. 1-2A, the user should wear the VR goggle from their x− direction, i.e., the x− direction of the VR goggle is relatively close to the user, while the x+ direction of the VR goggle is relatively far from the user. Therefore, it may be conceived that the x+ direction as shown in FIGS. 1-2A is the distal side of the VR goggle relatively to the user, and a facet of the body 1 in the x+ direction is the distal facet.

Further, the cover 2 has a first clamping part 31 on an internal surface of the cover 2 and the body 1 has a second clamping part 32 on the distal facet of the body 1. The first clamping part 31 and second clamping part 32 may clamp the electronic device respectively from the x+ direction and the x− direction, such that the electronic device 9 may be securely confined in the cavity between the body 1 and cover 2, even when the VR goggle shakes to some extent in accident or the VR goggle waggles for the user wearing the VR goggle performs actions, such as, walking, raising, bowing or turning his/her head. As a result, it avoids that content played by the electronic device 9 shifts or waggles relatively to the user's sight. Immersed experience of the user may not be affected. Discomfort (such as, dizziness) of the user resulted from waggling of image may also be avoided.

In an embodiment, the first clamping part 31 and second clamping part 32 may be made of elastic materials. Thereby, upon the electronic device 9 is positioned in the cavity, the first clamping part 31 and second clamping part 32 are deformable for space limitation, so as to clamp the electronic device 9. The stability for clamping of the electronic device 9 may be further improved.

For example, the first clamping part 31 may include a foam pad (for example, an ethylene-vinyl acetate copolymer (EVA) foam pad) adhered to an inner side of the cover 2. The second clamping part 32 may include a silicone pad fixed on the distal facet of the body 1. The silicone pad usually contacts with a screen of the electronic device 9 when engaging with the electronic device 9, and thus may serve as an antiskid element between the second clamping part 32 and the electronic device 9. Therefore, stability for clamping of the electronic device 9 may be further improved.

Figure 3:
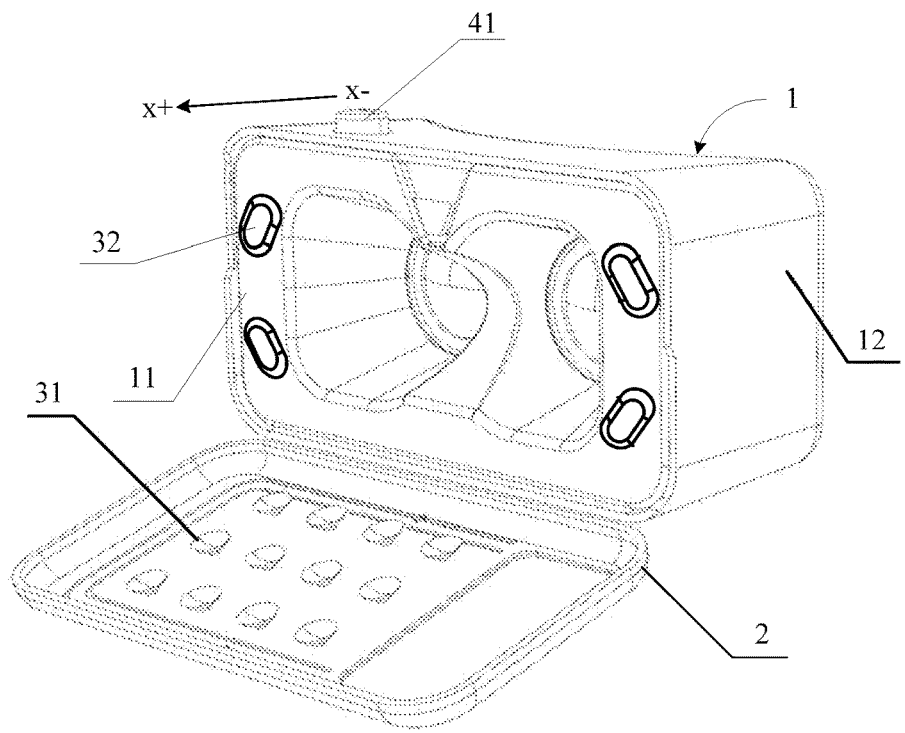
FIG. 3 is a schematic three-dimensional structural diagram showing another VR goggle according to an exemplary embodiment of the disclosure.

In another embodiment, as shown in FIG. 3, the first clamping part 31 may include a number of suckers fixed on an inner side of the cover 2. On one hand, the suckers may suck a backboard of the electronic device 9, to further improve the stability for clamping of the electronic device 9. On the other hand, the suckers may form an interstice between the electronic device 9 and the cover 2, which may contribute to heat dissipation of the electronic device 9.

In the above embodiment, the cover 2 may rotate around a predetermined spindle, to realize its function of uncovering and covering the body 1. It is convenient for a user to position the electronic device 9 between the cover 2 and body 1, when the body 1 is uncovered by the cover 2. The above-mentioned cavity may be formed and the electronic device 9 may be clamped by the first clamping part 31 and second clamping part 32, when the body 1 is covered by the cover 2. As shown in FIG. 1-2A, the cover 2 is rotabaly connected to the body 1 at its bottom edge. Safety for using the electronic device 9 may be improved by that the cover 2 is engaged and connected with the body 1 at its bottom, especially when rotational angle of the cover 2 is limited (for example, the maximum rotational angle is the angle shown in FIGS. 1-2A, i.e., the cover 2 is approximately horizontal), since this design prevents the electronic device 9 from dropping out, even when the cover 2 is unexpectedly opened. For example, the cover 2 may be connected to the body 1 with a hinge, which is not limited in the present disclosure.

Figure 2B:
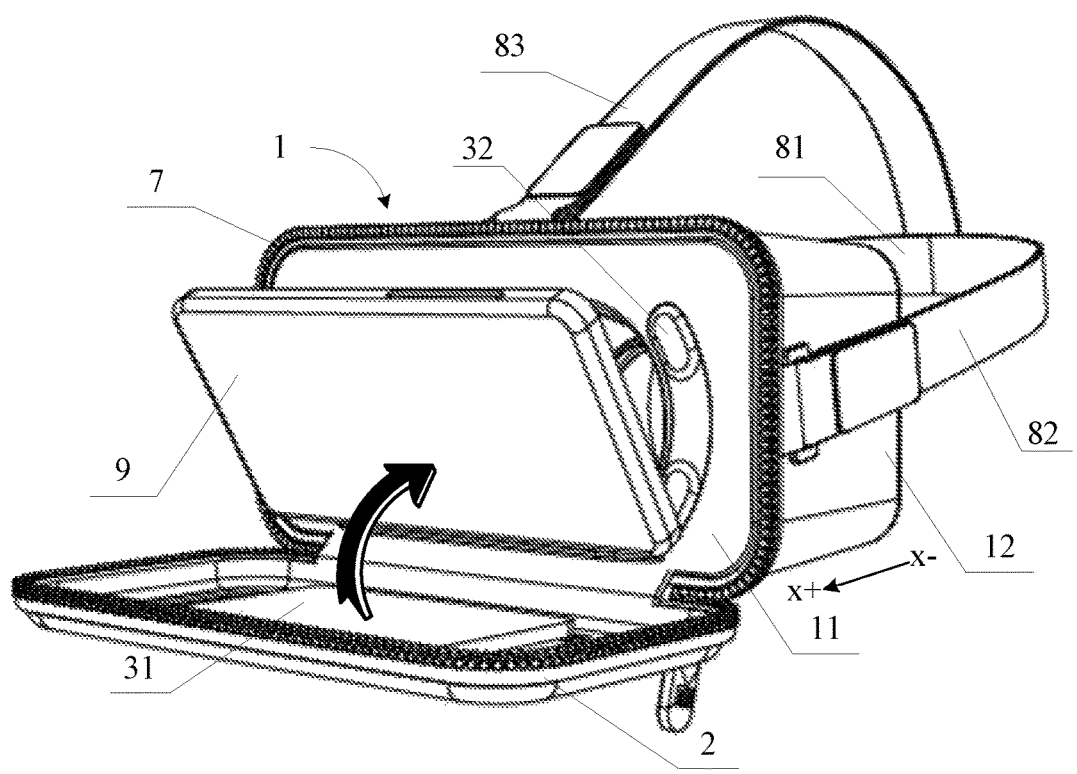
FIG. 2B is a schematic diagram showing another engagement of a VR goggle with an electronic device according to an exemplary embodiment of the disclosure.

When the cover 2 is engaged with the body 1 at its bottom, the cover 2 may be engaged with the body 1 at its top edge and side edges, such that the cover 2 is connected to the body 1. As shown in FIG. 2B, a zipper structure 7 may be configured at the top edge and side edges of the cover 2, which may be used to connect the cover 2 with the body 1. The zipper structure 7 may provide higher reliability, as compared with other connection structures (such as, a snap joint), such that a security risk of the electronic device 9 resulted from unexpected open of the cover 2 may be avoided. At the same time, as shown in FIG. 2B, the user may wear the whole VR goggle on his/her head via a head band arranged externally to the body 1, to have immersed VR experience, after the electronic device 9 is positioned in the cavity between the cover 2 and the body 1.

In the embodiment shown in FIG. 2B, for example, the head band may include a first side connecting band 81, a second side connecting band 82 and a top connecting band 83. A first end of the first side connecting band 81 and a first end of the first side connecting band 82 are symmetrically connected to two sides of the body 1. A first end of the top connecting band 83 is connected to top center of the body 1. A second end of the first side connecting band 81 and a second end of the first side connecting band 82 are connected with a second end of the top connecting band 83 at the same point. Thereby, the first side connecting band 81 and second side connecting band 82 may form a circle in the horizontal direction to band the VR goggle on a user's head. A connection among the top connecting band 83, the circle and the top of the body 1 enables the top connecting band 83 to engage with the user's head, so as to prevent the VR goggle from slipping, and eventually ensure steady wear of the VR goggle.

Figure 4:
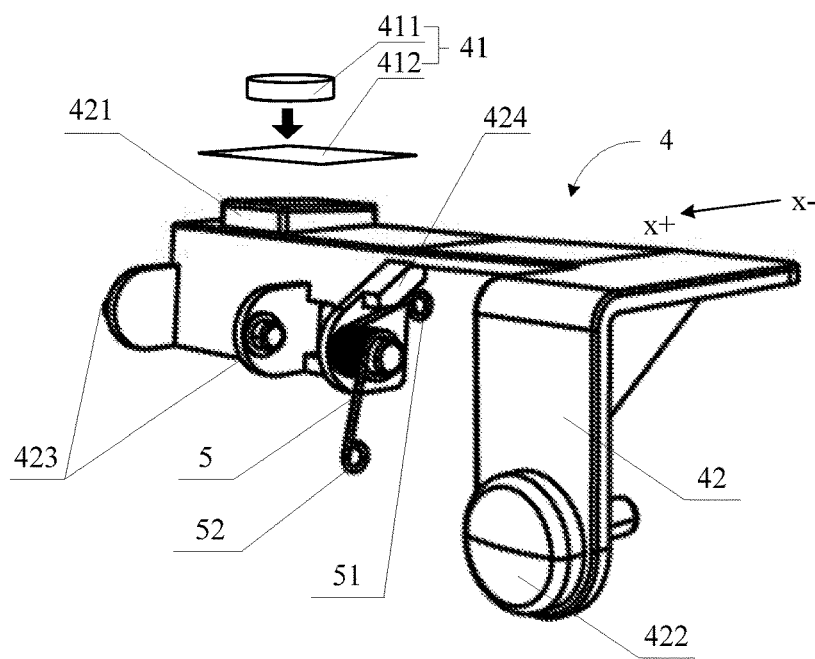
FIG. 4 is a schematic decomposed structural diagram showing a control structure in a VR goggle according to an exemplary embodiment of the disclosure.

Further, in the VR goggle of the present disclosure, the VR functional component 11 may include a control structure 4, through which a user may manipulate the electronic device 9 positioned in the VR goggle. As shown in FIG. 4, the control structure 4 may include a trigger part 41 and a delivery part 42. The trigger part 41 may be used by a user to perform a trigger operation. By engagement with the trigger part 41, the delivery part 42 may engage with the electronic device 9 when the trigger operation is performed to input a predetermined control instruction into the electronic device 9.

The trigger part 41 may include a metal button 411, and the delivery part 42 may include a conductive element. The conductive element, in response to the trigger operation on the trigger part 41, may be electrically connected to the metal button 411 at its head end 421 and may contact with a touch screen of the electronic device 9 at its tail end 422, to input the predetermined control instruction. The conductive element may be a conductive plastic element. Therefore, a conductive silicone contact may be arranged at the tail end 422 of the conductive element, such that the touch screen of the electronic device 9 may be prevented from scratching, when the tail end 422 is engaged with the touch screen.

Figure 5:
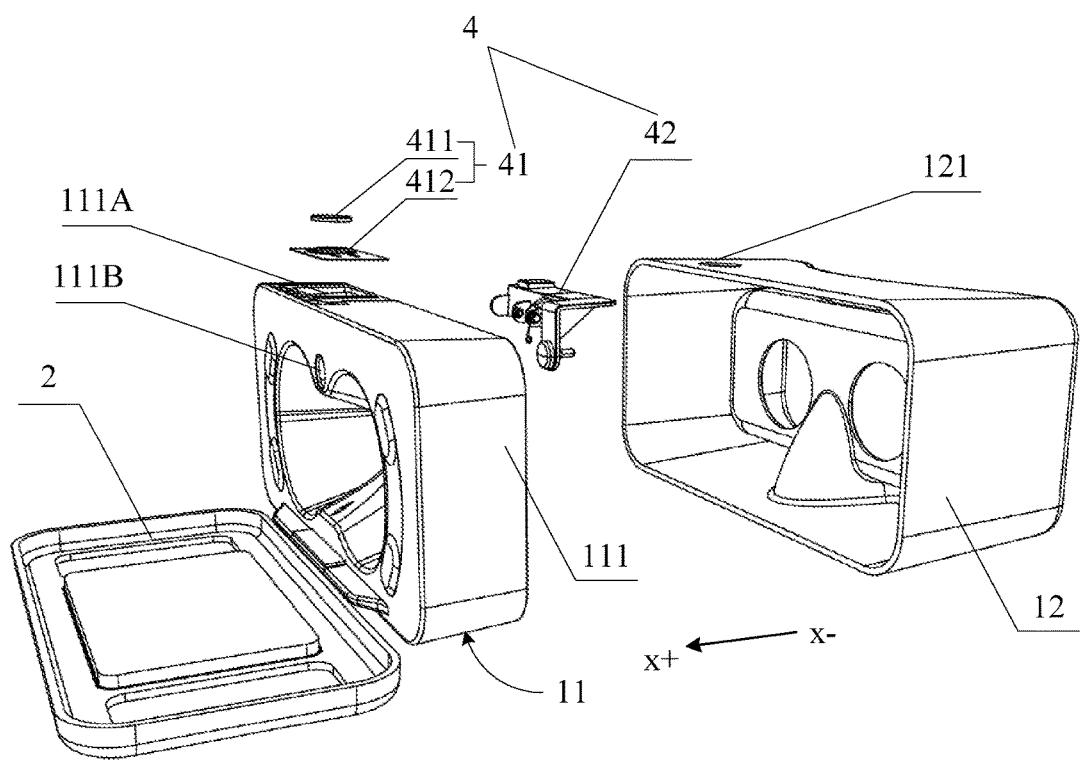
FIG. 5 is a schematic diagram showing assembly of a control structure and a display functional structure of a VR goggle according to an exemplary embodiment of the disclosure.
Figure 6:
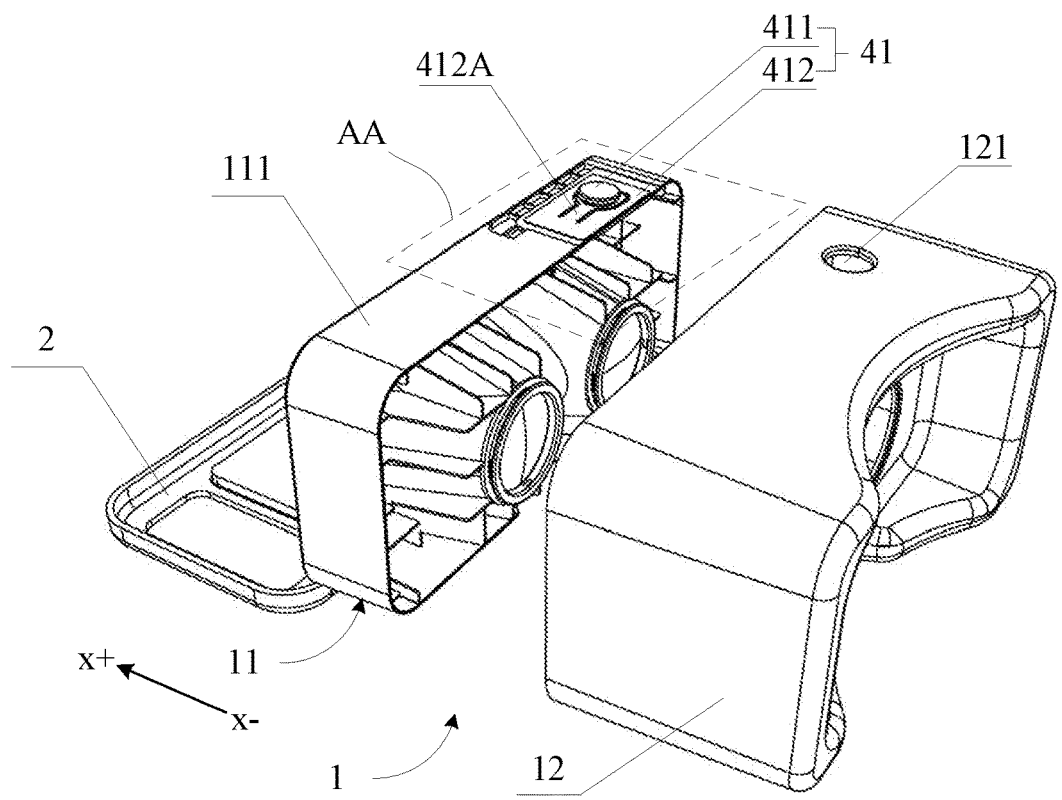
FIG. 6 is a schematic diagram showing assembly of a VR functional component and a housing according to an exemplary embodiment of the disclosure.

As shown in FIG. 5-6, when the body 1 includes a housing 12 and the above-mentioned VR functional component 11, the VR functional component 11 may include the above-mentioned control structure 4 and a display functional structure 111. The housing 12 may include a first opening 121. The display functional structure 111 may include a second opening 111A corresponding to the first opening 121. On one hand, the metal button 411 of the trigger part 41 may pass through the first opening 121 and extends to the surface of the body 1. For example, when the first opening 121 is on the top of the housing 12, a user may see and touch the metal button 411 on the VR goggle as shown in FIG. 1, so as to facilitate the user to perform the trigger operation. On the other hand, the metal button 411 may pass through the second opening 111A and engage with the delivery part 42 arranged in the display functional structure 111, such that the tail end 422 of the delivery part 42 may pass through a third opening 111B opened on the display functional structure 111 and facing the electronic device 9 (for example, as can be seen from FIG. 1, the tail end 422 passes through the display functional structure 111), to engage with the electronic device 9.

In an embodiment, as shown in FIG. 4, the delivery part 42 may include a spindle 423. The spindle 423 is rotatably fixed in the display functional structure 111. As such, when the trigger part 41 moves in a predetermined direction to press the delivery part 42 in response to the trigger operation, for example, when the trigger part 41 presses the head end 421 of the delivery part 42 straight down, the delivery part 42 may rotate around an axis of the spindle 423, such that the tail end 422 of the delivery part 42 moves towards and contact with the touch screen of the electronic device 9, to input the predetermined control instruction. Certainly, the delivery part 42 may rotate by other ways or with other structures in addition to the spindle 423, which is not limited in the present disclosure.

Further, when the control structure 4 utilizes the above structure and scheme to enable the trigger part 41 and delivery part 42 to move in response to the trigger operation performed by a user, displacement of the trigger part 41 and delivery part 42 may be reset, in order to facilitate a user to perform the trigger operation repeatedly.

Regarding the trigger part 41, as shown in FIGS. 4-6, the trigger part 41 may include a sheetmetal 412 and a metal button 411 fixed on the sheetmetal 412 (or other forms of trigger button of may also be used, and the metal button 411 is taken as an example). The sheetmetal 412 may include a reset elastic shim 412A, and the metal button 411 may be fixed on the reset elastic shim 412A. The trigger button moves in a predetermined direction in response to the trigger operation (for example, the metal button 411 moves straight down), such that the reset elastic shim 412A is deformed and the reset elastic shim 412A and the metal button 411 fixed on the reset elastic shim 412A may have a trend for reset. When an influence of the trigger operation disappears, the metal button 411 may reset along with the reset elastic shim 412A, and be ready to be pressed by a user again.

Figure 7:
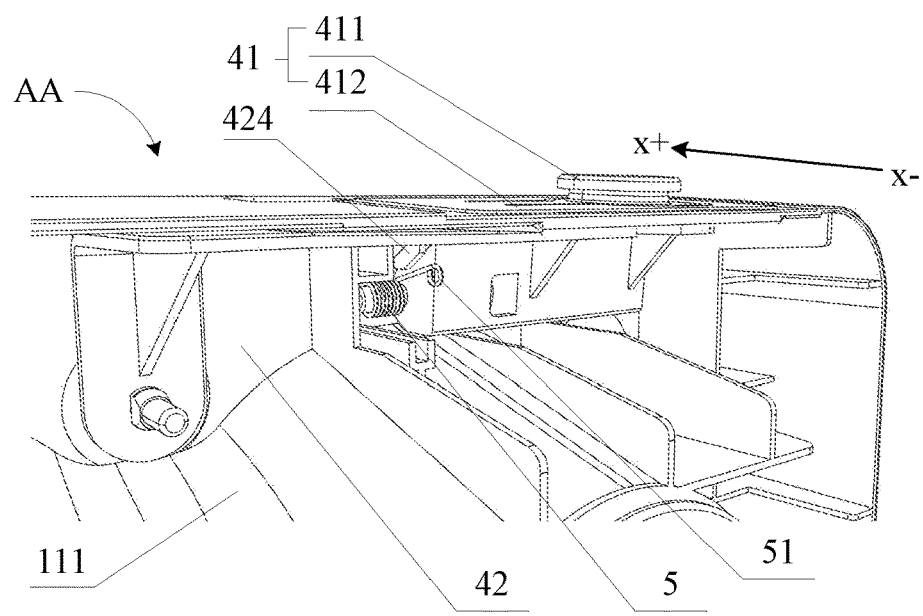
FIG. 7 is a partial enlarged schematic diagram of an AA area as shown in FIG. 6

Regarding the delivery part 42, the VR functional component 11 includes an elastic structure therein, for example, a spring 5 as shown in FIG. 4. The spring 5 may include a first end 51 and a second end 52. The first end 51 may reach a surface of a bump 424 on the delivery part 42, and the second end 52 may reach into the display functional structure 111. As shown in FIG. 7, when a user push down the metal button 411, the metal button 411 presses the delivery part 42 via the reset elastic shim 412A. As a result, the bump 424 may press the first end 51 of the spring 5, while the delivery part 42 is rotating; and the spring 5 may be deformed in response to the press on the delivery part 42, leading to a trend of reset of the delivery part 42, since the second end 52 (which is not illustrated in FIG. 7) of the spring 5 reaches into the display functional structure 111.

Meanwhile, a user may obtain corresponding feedback of a stroke of the button when performing the trigger operation, and would thus have better operation experience, through resetting the trigger part 41 and the delivery part 42 by structures, such as, the above-mentioned reset elastic shim 412A and spring 5.

Though the embodiment of the disclosure only includes one control structure 4, VR goggle based on other embodiments of the disclosure may include one or more control structures 4. For example, each of a plurality of control structures 4 may be used to implement a corresponding control function, and each control structure 4 may be formed as the structure of any embodiment proposed in the disclosure, which will not be repeated herein.

It is to be noted that the housing 12 as shown in FIG. 5-6 may be made of any materials, such as, plastics and foam. As an example, in the disclosure, the housing 12 may be formed of EVA foam extrusion lycra fabric, such that, on one hand, weight of the whole VR goggle may be decreased to reduce a load on head of a user who is wearing the VR goggle, and on the other hand, user comfort level of the housing 12 when it touches the user's face may be enhanced.

Other embodiments of the disclosure will be apparent to those skilled in the art from consideration of the specification and practice of the disclosure herein. This application is intended to cover any variations, uses, or adaptations of the disclosure following the general principles thereof and including such departures from the present disclosure as come within known or customary practice in the art. It is intended that the specification and embodiments should be considered as exemplary only, with a true scope and spirit of the disclosure being indicated by the following claims.

It will be appreciated that the inventive concept is not limited to the exact construction that has been described above and illustrated in the accompanying drawings, and that various modifications and changes can be made without departing from the scope thereof. It is intended that the scope of the disclosure only is limited by the appended claims.

What is claimed is:

1. A virtual reality (VR) goggle, operable with an electronic device for displaying VR content, the VR goggle comprising:
　a body comprising a second clamping part on a distal facet of the body; and
　a cover positioned at a distal side of the body to form a cavity between the cover and the distal facet of the body to accommodate the electronic device for displaying VR content, the cover comprising a first clamping part on an internal surface of the cover; and
　wherein the first clamping part is operable with the second clamping part to securely confine the electronic device within the cavity; and
　wherein the body further comprises:
　　a housing having a first opening; and
　　a VR functional component positioned in the housing, the VR functional component comprising:
　　　a display functional structure having a second opening corresponding to the first opening and a third opening facing the electronic device; and
　　　a control structure positioned in the display functional structure, the control structure comprising:
　　　　a trigger part positioned at a surface of the body and used by a user to perform a trigger operation; and
　　　　a delivery part engaged with the trigger part to enable a tail end of the delivery part to cooperate with the electronic device to input a predetermined control instruction into the electronic device when the trigger operation is performed.

2. The VR goggle of claim 1, wherein the first clamping part and the second clamping part are made of elastic materials; and
　wherein the first clamping part and the second clamping part are deformable upon clamping the electronic device, so as to clamp the electronic device.

3. The VR goggle of claim 2, wherein the first clamping part comprises a foam pad adhered to an inner side of the cover.

4. The VR goggle of claim 2, wherein the second clamping part comprises a silicone pad fixed on the distal facet of the body.

5. The VR goggle of claim 1, wherein the first clamping part comprises a number of suckers fixed on an inner side of the cover which suck a backboard of the electronic device.

6. The VR goggle of claim 1, wherein the cover is rotatably connected to the body at a bottom edge of the cover.

7. The VR goggle of claim 6, wherein the cover has a zipper structure at a top edge and side edges for connecting with the body.

8. The VR goggle of claim 1, wherein the trigger part passes through the first opening and extends to the surface of the body, and passes through the second opening to engage with the delivery part, and the tail end of the delivery part passes through the third opening to engage with the electronic device.

9. The VR goggle of claim 8, wherein the housing is formed of foam extrusion lycra fabric.

10. The VR goggle of claim 1, wherein:
    the trigger part is movable in a predetermined direction to press the delivery part in response to the trigger operation; and
    the delivery part rotates around a predetermined spindle such that the tail end of the delivery part engages with the electronic device upon the press.

11. The VR goggle of claim 10, wherein the VR functional component comprises:
    an elastic structure, the elastic structure being deformable in cooperation with the trigger part to be pressed to enable the delivery part to maintain a reset tendency.

12. The VR goggle of claim 10, wherein the trigger part comprises:
    a reset elastic shim; and
    a trigger button fixed on the reset elastic shim, the trigger button being movable in the predetermined direction in response to the trigger operation and deforming the reset elastic shim to form a reset tendency for the reset elastic shim and the trigger button.

13. The VR goggle of claim 1, wherein the trigger part comprises a metal button.

14. The VR goggle of claim 13, wherein the delivery part comprises:
    a conductive element, the conductive element being electrically connected to the metal button at a head end of the conductive element and contacting with a touch screen of the electronic device at a tail end of the conductive element to input the predetermined control instruction in response to the trigger operation.

15. The VR goggle of claim 14, wherein the conductive element comprises a conductive plastic element.

16. The VR goggle of claim 1, wherein the VR goggle comprises:
    a head band arranged externally to the body, the head band comprising:
        a first side connecting band comprising a first end and a second end;
        a second side connecting band comprising a first end and a second end;
        a top connecting band comprising a first end connected to top center of the body and a second end;
    wherein the first end of the first side connecting band and the first end of the second side connecting band are symmetrically connected to two sides of the body; and
    wherein the second end of the top connecting band, the second end of the first side connecting band, and the second end of the second side connecting band are connected at the same point.

\* \* \* \* \*